(12) United States Patent
Ito et al.

(10) Patent No.: US 6,626,658 B2
(45) Date of Patent: Sep. 30, 2003

(54) MOLD CLAMPING MECHANISM OF MOLDING MACHINE

(75) Inventors: Susumu Ito, Hino (JP); Koichi Nishimura, Susono (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/809,111

(22) Filed: Mar. 16, 2001

(65) Prior Publication Data

US 2001/0031292 A1 Oct. 18, 2001

(30) Foreign Application Priority Data

Mar. 16, 2000 (JP) .................................. 2000-073498

(51) Int. Cl.[7] ............................................. B29C 45/64
(52) U.S. Cl. .................. 425/170; 100/258 A; 425/589; 425/593
(58) Field of Search .................. 425/149, 170, 425/450.1, 451.6, 589, 593; 100/258 A, 286

(56) References Cited

U.S. PATENT DOCUMENTS

| | | | | |
|---|---|---|---|---|
| 4,370,116 A | * | 1/1983 | Groom | 425/589 |
| 4,429,579 A | | 2/1984 | Wilhelm | |
| 4,732,489 A | | 3/1988 | Tanaka | |
| 5,378,141 A | * | 1/1995 | Aoki | 425/589 |
| 5,531,580 A | * | 7/1996 | Bonino et al. | 425/450.1 |
| 6,210,144 B1 | * | 4/2001 | Mailliet et al. | 425/589 |

FOREIGN PATENT DOCUMENTS

| | | |
|---|---|---|
| FR | 1 267 546 | 7/1961 |
| FR | 2 496 548 | 6/1982 |
| JP | 6-241228 | 8/1994 |
| JP | 7-156232 | 6/1995 |
| JP | 7-285154 | 10/1995 |
| JP | 10-026135 | 1/1998 |
| JP | 10-34714 | 2/1998 |

* cited by examiner

Primary Examiner—James P. Mackey
(74) Attorney, Agent, or Firm—Staas & Halsey LLP

(57) ABSTRACT

A ball spline nut is provided in each of tie bar penetrating holes formed in a moving platen constituting a mold clamping mechanism of an injection molding machine. On the other hand, a portion of a tie bar one end of which is fixed to a stationary platen, engaging with the tie bar penetrating hole in the moving platen, is made a ball spline shaft. Since there is no clearance between the ball spline shaft and the ball spline nut engaging therewith, in mold clamping and mold releasing processes, the posture of a movable mold attached to the moving platen with respect to a stationary mold attached to the stationary platen is always kept constant.

8 Claims, 3 Drawing Sheets

MOLD CLAMPING MECHANISM OF MOLDING MACHINE

BACKGROUND OF THE INVENTION

1. Field of the Invention

The present invention relates to a mold clamping mechanism of a molding machine such as an injection molding machine.

2. Description of the Prior Art

In a conventional mold clamping mechanism of a molded machine such as an injection molding machine, a stationary platen and a rear platen are usually connected to each other by four tie bars, and a moving platen is disposed between the stationary platen and the rear platen. The moving platen has four tie bar penetrating holes, and a tie bar passes through each of these holes.

A movable mold is attached to a face of the moving platen, opposed to the stationary platen, and a stationary mold is attached to a face of the stationary platen, opposed to the moving platen. To perform mold camping or mold releasing the moving platen is moved toward or away from the stationary platen by a driving source such as an electric motor and a hydraulic cylinder.

When the moving platen is moved, the tie bars serve as a guide. In the tie bar penetrating hole formed in the moving platen is installed a bush serving as a sliding bearing. The tie bar passes through the bush A problem with the conventional mold clamping mechanism is that if the injection molding machine is used for a long period of time, a clearance or play between the bush installed in the penetrating hole formed in the moving platen and the tie bar increases. As a result, the moving platen guided by the tie bars tilts, so that a face of the movable mold attached to the moving platen and a face of the stationary mold attached to the stationary platen become nonparallel with each other.

In the mold releasing process, if the face of the movable mold is not parallel with the face of the stationary mold, there occurs a phenomenon such that a part of the face of the movable mold is separated from a part of the face of the stationary mold while other parts of the face of the movable mold remain in contact with other parts of the face of the stationary mold. If such a phenomenon occurs when a high precision part such as a lens is molded by using an injection molding machine, a strain such as a tensile stress is imparted to a molded product, so that a possibility of molding a defective product increases.

To avoid this phenomenon a technology has been proposed in which a straight guide is provided on a base frame of the molding machine to guide the moving platen by using the straight guide. The purpose of this technology is to prevent the moving platen from tilting so that the moving platen is kept parallel with the stationary platen.

However, since the straight guide does not support the upside of the moving platen though supporting and guiding the downside (base frame side) thereof it cannot restrain a tilt of the upside of the moving platen Also, although the straight guide can prevent the moving platen from tilting transversely with respect to the travel direction of the moving platen, it has a problem in that it is difficult to prevent a longitudinal tilt.

OBJECT AND BRIEF SUMMARY OF THE INVENTION

An object of the present invention is to provide a mold clamping mechanism of an injection molding machine, in which a fie of a movable mold attached to a moving platen is kept parallel with a stationary mold attached to a stationary platen to prevent the moving platen, sliding while being guided by tie bars, from tilting with respect to the tie bars.

To achieve the above object, in the present invention, a ball spline nut is provided in a tie bar penetrating hole formed in the moving platen, and at least a portion of the tie bar which slides with respect to the moving platen is made a ball spline shaft, by which the engagement of tie bar with the moving platen is made a ball spline connection. Thereby, a clearance or play between the tie bar and the moving platen is eliminated, so tat the posture of the moving platen can always be kept constant.

Also, a hole for inserting a sensor for measuring a strain of the tie bar to make measurement and adjustment of a mold clamping force developed by the tie bar is formed in the tie bar along the axial direction from the end face central portion of the tie bar. The number of the tie bars is four, and two or more of the ball spline nuts are provided for every tie bar, so that a tilt of the moving platen can be prevented more reliably.

According to the present invention, since the moving platen is not tilted even when it slides while being guided by the tie bars, when the injection molding machine is in a mold releasing process, the whole area of the face of the movable mold attached to the moving platen separates temporarily from the face of the stations mold attached to the stationary platen. Therefore, a strain such as a tensile stress is not applied to a molded product, so that highly accurate product can be molded

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
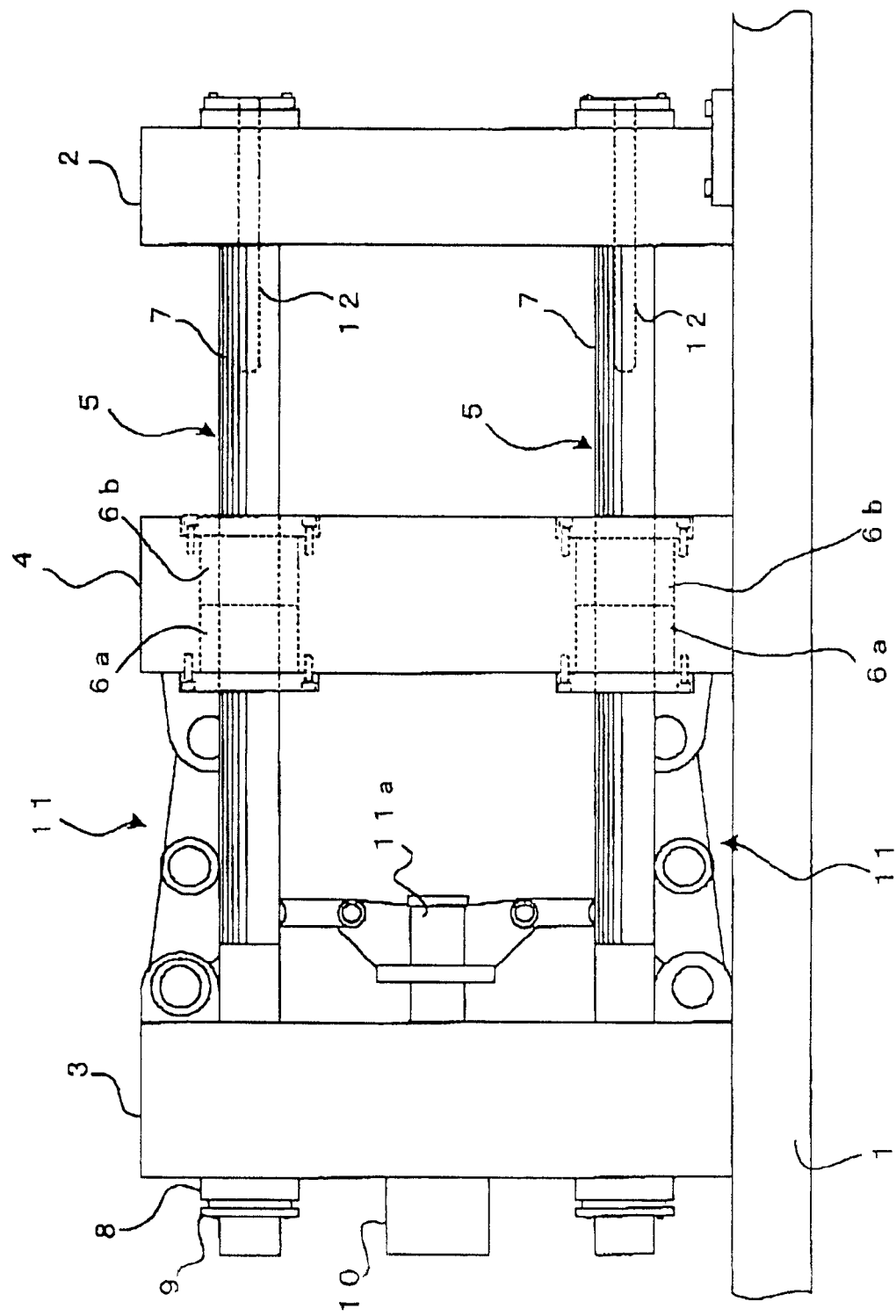
FIG. 1 is a schematic view of a mold camping mechanism in accordance with one embodiment of the present invention.

An outline of a mold clamping mechanism of an injection molding machine in accordance with one embodiment of the present invention will be described with reference to FIG. 1.

A stationary platen 2 is fixed on a base frame 1 of an injection molding machine. To the stationary platen 2 is fixed one end of each of four tie bars 5. The other end of the tie bar 5 passes through a rear platen 3 supported on the base frame 1.

A face of the stationary platen 2, opposed to the rear platen 3, has a square shape, and also a face of the rear platen 3, opposed to the stationary platen 2, has a square shape. One end of each of the four tie bars 5 is fixed at each of four comers of the stationary platen 2, and the other end thereof passes through each of four corners of the rear platen 3. FIG. 1 shows only two of the four tie bars 5.

One end of the tie bar 5 is fixed to the stationary platen 2 by using fastening means such as a nut, while on the other hand, the other end of the tie bar 5 is attached to the rear platen 3 so that the rear platen 3 can move along the tie bar 5 via a mold thickness adjusting nut 8.

The mold thickness adjusting nut 8 has a pinion 9 fixed thereto. A chain (not shown) is set between the pinions 9 provided on the four tie bars 5, and the four pinions 9 are rotationally driven in synchronism with each other by a mold thickness adjusting drive means (not shown) such as a servomotor, by which the rear platen 3 is moved on the base frame 1 in the axial direction of the tie bar 5. By the movement of the rear platen 3, a distance between the rear platen 3 and the stations platen 2 is adjusted As a result, a predetermined mold clamping force at the time of mold clamping can be obtained according to the thickness of a mold used Further, a moving platen 4 is disposed between the stationary platen 2 and the rear platen 3. The moving platen 4 is formed with tie bar penetrating holes at four corners thereof Through each of the tie bar penetrating holes, the tie bar 5 passes.

Between the rear platen 3 and the moving platen 4, a toggle mechanism 11 is provided. When across head 11a of the toggle mechanism 11 is actuated by a driving source 10 such as a servomotor fixed to the rear platen 3, the moving platen 4 moves in such a direction as to go away from or come close to the rear platen 3.

A stationary mold (not shown) is mounted on a face of the stationary platen 2, opposed to the moving platen 4, while a movable mold (not shown) is mounted on a face of the moving platen 4, opposed to the stationary platen 2. The driving source 10 is driven to actuate the toggle mechanism 11 so that the moving platen 4 is moved along the tie bars 5, by which the opening and closing of the mold (stationary mold and movable mold) and mold clamping are performed.

The above-described configuration is the same as that of a conventional toggle type mold clamping mechanism.

In the present invention, a ball spline is formed on the tie bar 5 at least in a range in which the moving platen 4 slides, providing a ball spline shaft 7. On the other hand, a pair of ball spline nuts 6a and 6b is provided in the penetrating hole formed in the moving platen 4 through which the tie bar 5 passes. Specifically, in the present invention, in place of the bush (sliding bearing) provided in the tie bar penetrating hole, a single or a plurality of ball spline nuts are provided. Further, corresponding to these ball spline nuts, a range engaging with the tie bar penetrating hole in the moving platen 4 of the tie bar 5 is formed into the ball spline shaft 7. In this respect, the mold clamping mechanism in accordance with the present invention differs from the conventional one.

Figure 3:
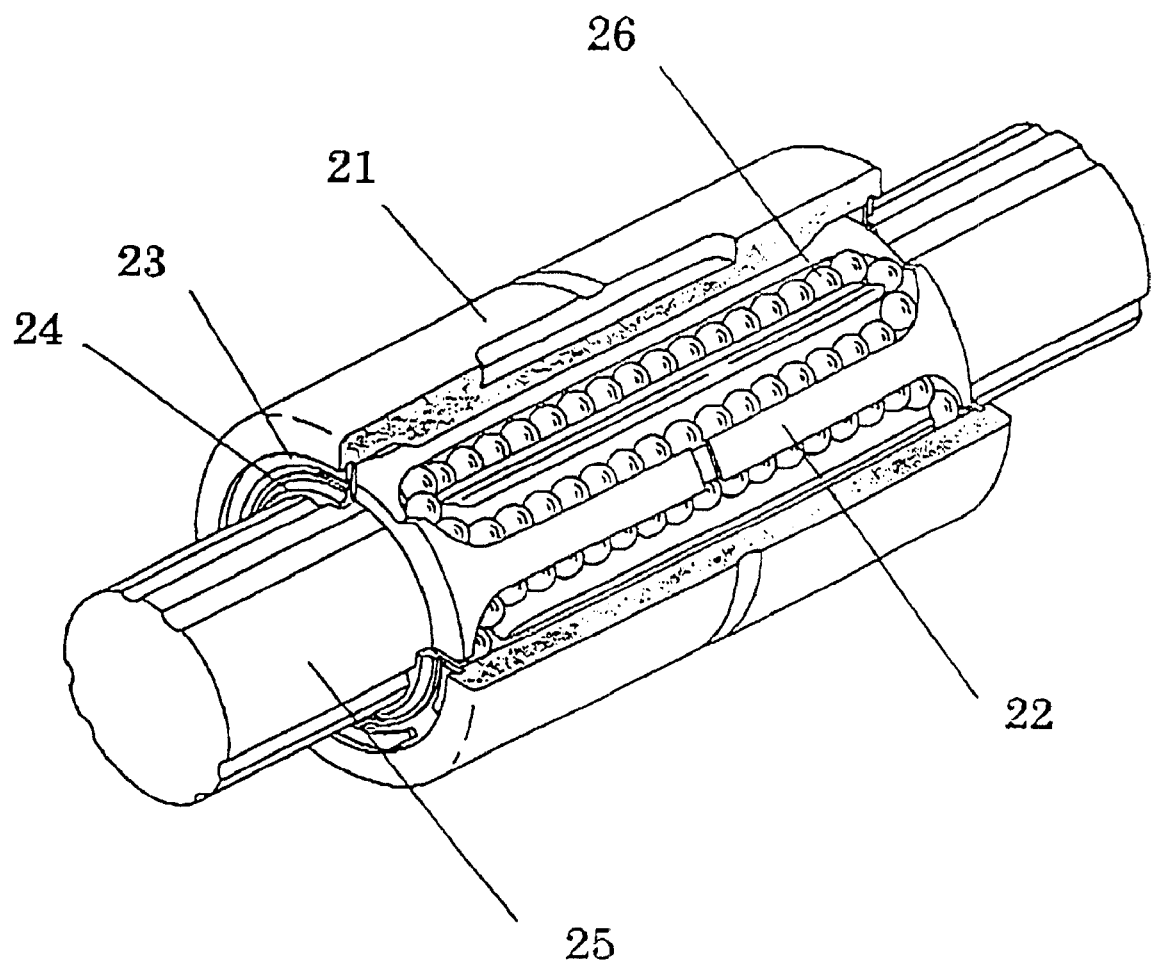
FIG. 3 shows one example of a ball spline nut employed in the mold clamping mechanism shown in FIG 1.

FIG. 3 shows one example of a ball spline nut employed in the mold clamping mechanism shown in FIG. 1, which comprises an outer cylinder 21, a retainer 22, a ball stopping ring 23 and sealing 24. A spline shaft 25 is inserted into the ball spline nut such that a spline shaft 25 can move in the axial direction of the ball spline nut. Reference numeral 26 denotes balls.

In the embodiment shown in FIG. 1, a pair of ball spline nuts 6a and 6b is provided in the tie bar penetrating hole formed in the moving platen 4. However, the number of ball spline nuts provided in one tie bar penetrating hole is not limited to two, and one or three (or more than three) ball spline nuts may be provided. If the number of ball spline nuts is increased, the length engaging with the ball spline shaft 7 increases, so that a tilt of the moving platen 4 can be prevented more securely. As a result, the posture of the movable mold attached to the moving platen 4 with respect to the stationary mold attached to the stationary platen 2 is kept constant more reliably.

Thus, to slide the moving platen 4 along the tie bars 5, a single or a plurality of ball spline nuts are provided in the tie bar penetrating hole formed in the moving platen 4, and also a ball spline is formed on the tie bar 5 at least in a range where the tie bar is engaged with the tie bar penetrating hole in the moving platen 4 to provide a ball spline shaft 7. A ball (not shown) engages with a ball rolling groove of this spline, and a pre-load is given to the ball. Therefore, between the ball spline shaft 7 and the ball spline nut 6a, 6b engaging therewith (therefore, between the tie bar 5 and the moving platen 4), a clearance (play) scarcely occurs. Moreover, since the tie bar 5 passes through the moving platen 4 at four corners thereof, the moving platen 4 does not tilt longitudinally and transversely with respect to the travel direction of the moving platen 4 (the axial direction of the tie bar 5).

Thereupon, even if the moving platen 4 moves along the tie bars 5 and lies at any position, the posture of the moving platen 4 with respect to the stationary platen 2 is always kept constant. Specifically, the face of the movable mold attached to the moving platen 4 is kept parallel with the face of the stationary mold attached of the stationary platen 2. As a result, when the movable mold is moved after molding and is released from the stationary mold to remove a molded product (in the mold releasing process), the whole area of the face of the movable mold separates temporarily from the whole area of the face of the stationary mold. A phenomenon that a part of the face of the movable mold is separated from a part of the face of the stationary mold while the parts of the face of the movable mold remain in contact with other parts of the face of the stationary mold does not take place. Therefore, a high precision part such as a lens can be molded with high accuracy.

Figure 2:
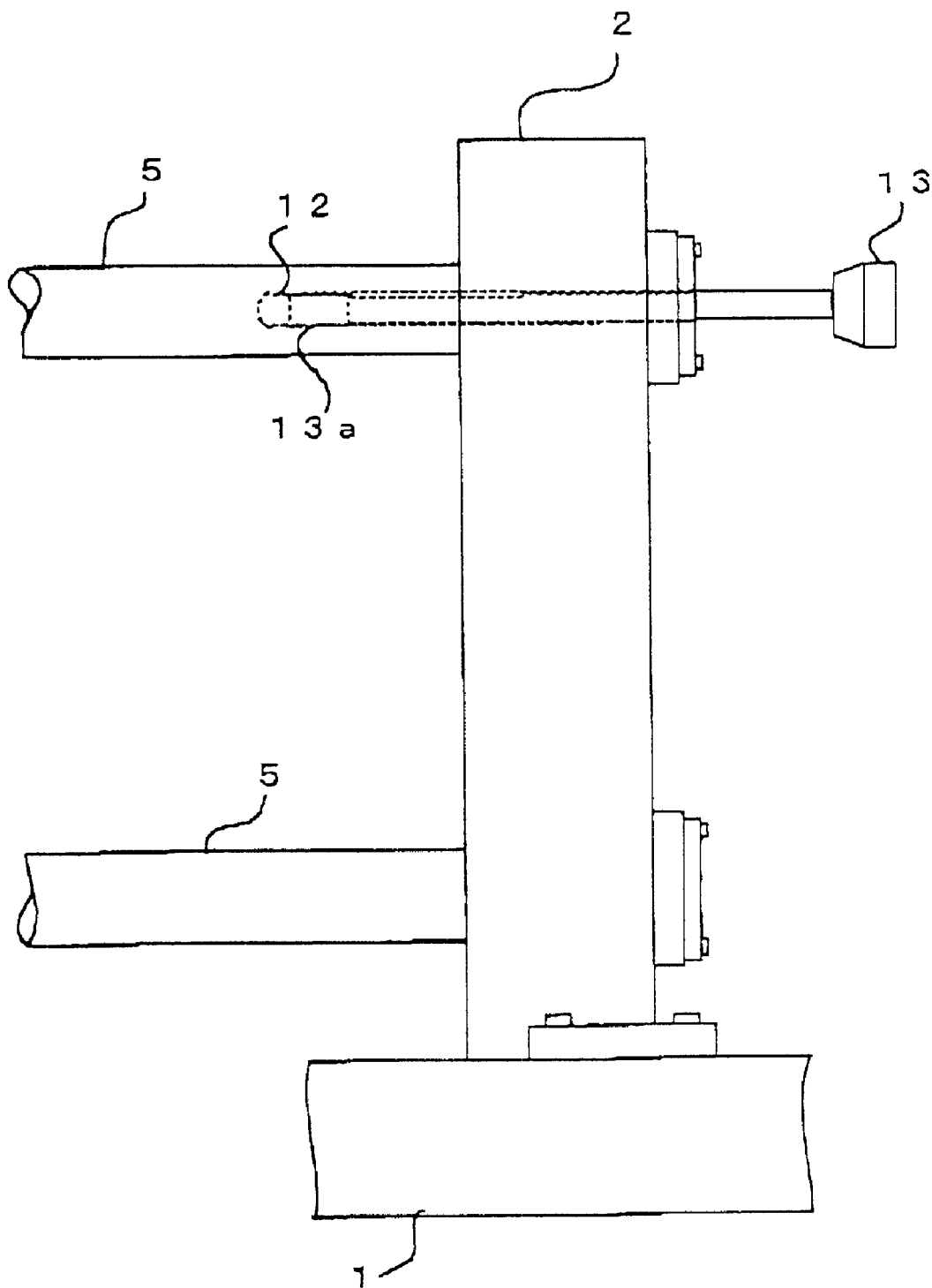
FIG. 2 is an explanatory view of strain measurement for a tie bar in the embodiment

Further, each of the tie bars 5 is formed with a sensor hole 12 for inserting a sensor 13 for detecting a strain of the tie bar 5 so that the sensor hole 12 has a predetermined depth from one end face (end f on the stationary platen side) of the tie bar 5. FIG. 2 is an explanatory view of a state in which the sensor 13 is inserted in the sensor hole 12 to detect a strain of the tie bar 5.

The sensor 13 used (for example, a strain sensor produced by Schlaepfer Sensors Ltd. in Switzerland is provided with a strain gage in a rod-like distal end portion 13a. The diameter of the distal end portion 13a provided with the strain gage is increased by turning the proximal end portion to bring the strain gage into dose contact with the inner peripheral surface of the hole 12 in the tie bar 5, by which a strain of the tie bar 5 is measured.

In the toggle type mold clamping mechanism shown in FIG. 1, a mold clamping force is applied to the mold by the elongation of the tie bars 5. Therefore, the sty of the tie bar 5 is measured by using the sensor 13, and the position of the rear platen 3 is adjusted so that a preset mold clamping force is provides In this case, if the strains of the tie bars 5 are equal (under a condition that the materials and diameters of the tie bars 5 are equal), it can be thought that an approximately equal mold clamping force is applied to the whole face of the mold. If the strains of the tie bars 5 are not equal it can be thought that an eccentric mold clamping force develops.

Thereupon, as described above, the sensor 13 is mounted successively in the sensor hole 12 in each of the tie bars 5, the mold is clamped, and the strain is detected successively Alternatively, the sensors 13 are mounted in the sensor holes 12 in the tie bars 5 at the same time, the mold is clamped, and the strains are measured at the same time. Thereby, the effective lengths of the tie bars 5 are adjusted so that the strains measured on the tie bars 6 are equal and the preset mold clamping force is provided.

In this adjustment, a mold thickness adjusting motor is driven to turn the nuts 8 of the tie bars 5 synchronously via the chain and the pinions 9, so that the rear platen 3 is moved to change a distance between the rear platen 3 and the stationary platen 2, by which the effective lengths of the tie bars 5 for developing a mold clamping force are adjusted. Further, in order to adjust the strains of the tie bars 5 and to balance the mold clamping force developing from each of the tie bars 5, the nut 9 of each of the tie bars 5 is turned individually to adjust the effective length of individual tie bar 5.

Although the toggle type mod camping mechanism has been described by way of example in the above-described embodiment, the present invention can be applied to a direct type mold clamping mechanism in which the moving platen is directly driven by the driving source such as a hydraulic cylinder or a servomotor without the use of the toggle mechanism.

What is claimed is:

1. A mold clamping mechanism of a molding machine, comprising:

a stationary platen with a stationary mold fixed on a base frame of said molding machine;

a plurality of tie bars, each having a first end fixed to said stationary platen and a portion that includes a plurality of spline grooves;

a moving platen formed with a plurality of tie bar penetrating holes, each of said plurality of tie bars passing through a respective one of the tie bar penetrating holes, such that said moving platen, which has a movable mold attached to one face, can be moved along said tie bars toward or away from said stationary platen, thereby performing mold clamping or mold releasing; and two or more ball spline nuts provided in each of the plurality of tie bar penetrating holes in said moving platen, said bail spline nut including a plurality of balls such that at least a portion of each ball spline nut engages said moving platen and the plurality of balls engages the spline grooves.

2. The mold clamping mechanism of a molding machine according to claim 1, wherein a sensor hole receiving a sensor for detecting an axial strain of each of said tie bars is formed at the first end of each of said tie bars.

3. The mold clamping mechanism of a molding machine according to claim 1, wherein the number of said tie bars is four.

4. The mold clamping mechanism of a molding machine according to claim 1, wherein said molding machine is an injection molding machine.

5. The mold clamping mechanism of a molding machine according to claim 4, wherein said moving platen is moved along said tie bars by driving a toggle mechanism.

6. A molding machine, comprising:

a stationary platen;

a plurality of tie bars, each having a first end fixed to the stationary platen and a portion that includes a plurality of spline grooves;

a moving platen with a plurality of tie bar penetrating holes, each of the plurality of tie bars passing through one of the plurality of the tie bar penetrating holes; and two or more ball spline nuts at each of the plurality of tie bar penetrating holes, said ball spline nut including a plurality of balls wherein at least a portion of the at least one ball spline nut is engaged with the moving platen and the plurality of balls engages the spline grooves.

7. The molding machine of claim 6, wherein the plurality of tie bars is at least four.

8. The molding machine of claim 6, wherein each of the plurality of tie bars further comprises a sensor that detects an axial strain of the respective tie bar in the axial direction.

* * * * *

UNITED STATES PATENT AND TRADEMARK OFFICE
CERTIFICATE OF CORRECTION

PATENT NO. : 6,626,658 B2
DATED : September 30, 2003
INVENTOR(S) : Susumu Ito et al.

It is certified that error appears in the above-identified patent and that said Letters Patent is hereby corrected as shown below:

Column 1,
Line 11, change "molded" to -- molding --
Line 22, insert -- , -- after "releasing"
Line 28, insert -- . -- after "bush"
Line 37, change "nonparallel" to -- non-parallel --
Line 49, insert -- , -- after "phenomenon"
Line 57, insert -- , -- after "thereof"

Column 2,
Line 1, change "fie" to -- face --
Line 12, change "tat" to -- that --
Line 27, change "stations" to -- stationary --
Line 30, insert -- . -- after "molded"
Line 60, change "comers" to -- corners --

Column 3,
Line 9, insert -- . -- after "adjusted"
Line 16, insert -- . -- after "thereof"

Column 4,
Line 21, change "of" to -- to --
Line 36, change "f" to -- face --
Line 46, change "dose" to -- close --
Line 51, change "sty" to -- strain --
Line 54, change "provides" to -- provided. --
Line 58, insert -- , -- after "equal"
Line 63, insert -- . -- after "successively"

UNITED STATES PATENT AND TRADEMARK OFFICE
CERTIFICATE OF CORRECTION

PATENT NO. : 6,626,658 B2
DATED : September 30, 2003
INVENTOR(S) : Susumu Ito et al.

It is certified that error appears in the above-identified patent and that said Letters Patent is hereby corrected as shown below:

<u>Column 5,</u>
Line 1, change "6" to -- 5 --
Line 14, change "mod camping" to -- mold clamping --

<u>Column 6,</u>
Line 1, change "bail" to -- ball --

Signed and Sealed this

Seventeenth Day of February, 2004

JON W. DUDAS
*Acting Director of the United States Patent and Trademark Office*